US012654426B2

(12) United States Patent　　(10) Patent No.:　　US 12,654,426 B2

Isomoto et al.　　(45) Date of Patent:　　Jun. 16, 2026

(54) GLASS RESIN LAMINATE

(71) Applicant: Nippon Electric Glass Co., Ltd., Shiga (JP)

(72) Inventors: Takehiko Isomoto, Shiga (JP); Yasuhiko Nozaki, Shiga (JP); Yoshio Tanaka, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 149 days.

(21) Appl. No.: 18/788,955

(22) Filed: Jul. 30, 2024

(65) Prior Publication Data

US 2024/0383233 A1　　Nov. 21, 2024

Related U.S. Application Data

(62) Division of application No. 17/678,493, filed on Feb. 23, 2022, now abandoned, which is a division of
(Continued)

(30) Foreign Application Priority Data

Apr. 13, 2017　　(JP) ................................. 2017-079586

(51) Int. Cl.
　　*B32B 17/10*　　　(2006.01)
　　*B32B 3/04*　　　(2006.01)
　　*B32B 7/12*　　　(2006.01)

(52) U.S. Cl.
　　CPC .......... *B32B 17/10293* (2013.01); *B32B 3/04* (2013.01); *B32B 7/12* (2013.01);
(Continued)

(58) Field of Classification Search
　　CPC ........ B32B 17/10293; B32B 17/10302; B32B 17/10935; B32B 17/10871;
(Continued)

(56) References Cited

U.S. PATENT DOCUMENTS

2015/0110991 A1　　4/2015　Miwa et al.
2016/0096345 A1　　4/2016　Miwa et al.
(Continued)

FOREIGN PATENT DOCUMENTS

EP　　　3269691　　　1/2018
JP　　63-147844　　　6/1988
(Continued)

OTHER PUBLICATIONS

International Search Report issued Jun. 12, 2018 in International (PCT) Application No. PCT/JP2018/011451.
(Continued)

*Primary Examiner* — John L Goff, II
(74) *Attorney, Agent, or Firm* — Wenderoth, Lind & Ponack, L.L.P.

(57)　　　ABSTRACT

Provided is a glass resin laminate (1), including: a resin layer (2); a glass sheet (3); an adhesive layer (4) configured to bond the glass sheet (3) and the resin layer (2); and a functional film (5) interposed in the adhesive layer (4). The adhesive layer (4) includes a first portion (4a) positioned between the resin layer (2) and the functional film (5), a second portion (4b) positioned between the glass sheet (3) and the functional film (5), and a fused portion (4c) obtained by fusing an end portion of the first portion (4a) and an end portion of the second portion (4b).

6 Claims, 5 Drawing Sheets

Related U.S. Application Data application No. 16/495,932, filed as application No. PCT/JP2018/011451 on Mar. 22, 2018, now abandoned.

(52) U.S. Cl.
CPC .. *B32B 17/10018* (2013.01); *B32B 17/10036* (2013.01); *B32B 17/10247* (2013.01); *B32B 17/1044* (2013.01); *B32B 17/10871* (2013.01); *B32B 17/10935* (2013.01); *B32B 2307/212* (2013.01); *B32B 2307/304* (2013.01); *B32B 2315/08* (2013.01); *B32B 2419/00* (2013.01); *B32B 2457/20* (2013.01)

(58) Field of Classification Search
CPC .......... B32B 17/10018; B32B 17/1088; B32B 17/10899; B32B 17/10036; B32B 17/10247; B32B 17/1044; B32B 3/04; B32B 7/12; B32B 7/022; B32B 2307/212; B32B 2307/304; B32B 2307/412; B32B 2307/71; B32B 2307/406; B32B 2307/306; B32B 2307/414; B32B 2307/51; B32B 2307/538; B32B 2307/732; B32B 2307/75; B32B 2315/08; B32B 2419/00; B32B 2457/20; B32B 2255/10; B32B 2255/205; B32B 2260/046; B32B 2260/028; B32B 27/06; B32B 27/34; B32B 27/36; B32B 27/08; B32B 27/12; B32B 27/304; B32B 27/308; B32B 27/32; B32B 27/288; B32B 27/10; B32B 27/365; B32B 27/285; B32B 5/024; B32B 5/26; B32B 29/005; B32B 29/02; B32B 2479/00; B32B 2535/00; B32B 2571/00

USPC .......................................... 156/106, 102, 107
See application file for complete search history.

(56) References Cited

U.S. PATENT DOCUMENTS

| | | | |
|---|---|---|---|
| 2017/0326843 A1 | 11/2017 | Noda | |
| 2019/0168488 A1 | 6/2019 | Manz | |

FOREIGN PATENT DOCUMENTS

| | | | | |
|---|---|---|---|---|
| JP | 2007-197288 | 8/2007 | | |
| JP | 2008-303084 | 12/2008 | | |
| JP | 2010-027972 | 2/2010 | | |
| JP | 2016-117191 | 6/2016 | | |
| JP | 2016210023 A | * 12/2016 | ............. | B32B 17/10 |
| WO | 2012/033894 | 3/2012 | | |
| WO | 2012/157610 | 11/2012 | | |
| WO | 2016/098769 | 6/2016 | | |
| WO | 2016/143636 | 9/2016 | | |
| WO | 2016/174956 | 11/2016 | | |
| WO | 2018/010865 | 1/2018 | | |

OTHER PUBLICATIONS

International Preliminary Report on Patentability and Written Opinion of the International Searching Authority issued Oct. 15, 2019 in International (PCT) Application No. PCT/JP2018/011451.
Machine translation of JP 63-147844 date unknown.

* cited by examiner

Fig. 10

Prior Art

GLASS RESIN LAMINATE

The present application is a divisional application of U.S. application Ser. No. 17/678,493, filed on Feb. 23, 2022, now abandoned, which is a divisional application of U.S. application Ser. No. 16/495,932, filed on Sep. 20, 2019, now abandoned, which is a U.S. national stage application of International (PCT) Application No. PCT/JP2018/011451, filed on Mar. 22, 2018, which claims priority to Japanese Application No. 2017-079586, filed on Apr. 13, 2017, the entire contents of these applications being incorporated by reference herein.

TECHNICAL FIELD

The present invention relates to a glass resin laminate obtained by laminating a glass sheet and a resin layer.

BACKGROUND ART

As is well known, glass is excellent in weather resistance, chemical resistance, and scratch resistance, but by contrast, has a drawback in that the glass is liable to break owing to physical impact or thermal impact. In order to solve the drawback, for example, a glass resin laminate obtained by bonding a resin layer to one surface, or each of both surfaces, of a glass sheet has been proposed. A resin is inferior in weather resistance, chemical resistance, and scratch resistance to the glass, but by contrast, has an advantage in that the resin has a specific gravity smaller than that of the glass and is strong against the physical impact. Accordingly, in the glass resin laminate, respective demerits in the glass sheet and the resin layer can be compensated with their respective merits. In addition, the laminate can be significantly reduced in weight as compared to a glass sheet having the same thickness.

Further, in recent years, a glass resin laminate configured to exhibit functions suitable for various applications by interposing a functional film between a glass sheet and a resin layer has been developed. In, for example, Patent Literature 1, there is a disclosure of a glass resin laminate obtained by: laminating glass sheets on both surfaces of a resin layer via adhesive layers to integrate the layer and the sheets; and arranging an intermediate sheet in the adhesive layer on at least one surface side of the resin layer. The intermediate sheet in the glass resin laminate has various functions, such as an infrared ray-shielding function, an electromagnetic wave-shielding function, and a design property.

A specific configuration of the glass resin laminate is described with reference to FIG. 10. A glass resin laminate 101 illustrated in FIG. 10 includes a resin layer 102, glass sheets 103, adhesive layers 104, and an intermediate sheet (functional film) 105. One of the adhesive layers 104 includes a first portion 104a and a second portion 104b formed in sheet shapes. The intermediate sheet 105 is arranged between the first portion 104a and the second portion 104b. In addition, the intermediate sheet 105 has the same dimensions as those of the resin layer 102 and the glass sheets 103, and is brought into a state in which its end surface 105a is exposed.

CITATION LIST

Patent Literature 1: JP 2016-117191 A

SUMMARY OF INVENTION

Technical Problem

When the end surface 105a of the intermediate sheet 105 is exposed as described above, the intermediate sheet 105 may be affected by moisture in air, or the end surface 105a may be damaged to cause the functional loss of the intermediate sheet 105 or the peeling of the intermediate sheet 105 starting from the end surface 105a.

The present invention has been made in view of the above-mentioned circumstances, and a technical object of the present invention is to prevent the functional loss and peeling of a functional film in a glass resin laminate.

Solution to Problem

According to one embodiment of the present invention, which has been made in order to achieve the above-mentioned object, there is provided a glass resin laminate, comprising: a resin layer; a glass sheet; an adhesive layer configured to bond the glass sheet and the resin layer; and a functional film interposed in the adhesive layer, wherein the adhesive layer comprises a first portion positioned between the resin layer and the functional film, a second portion positioned between the glass sheet and the functional film, and a fused portion obtained by fusing an end portion of the first portion and an end portion of the second portion.

With such configuration, the end portion of the functional film is covered with the fused portion of the first portion and the second portion in the adhesive layer, and hence the end portion of the functional film can be formed so as to be prevented from being exposed in the end portion of the glass resin laminate. Therefore, the end surface of the functional film is prevented from being brought into contact with outside air and being damaged by its contact with foreign matter. Thus, the functional loss and peeling of the functional film can be reliably prevented.

It is desired that an area of the functional film be set to be smaller than an area of the glass sheet, and an end portion of the functional film be arranged inside with respect to an end portion of the glass sheet. When the end portion of the functional film is arranged inside with respect to the end portion of the glass sheet as described above, the entirety of the functional film can be covered and protected with the glass sheet.

It is desired that an area of the glass sheet be set to be smaller than an area of the resin layer, and an end portion of the glass sheet be arranged inside with respect to an end portion of the resin layer. With this, damage to the end portion of the glass sheet due to its contact with foreign matter can be prevented.

It is preferred that the fused portion be exposed between the end portion of the resin layer and the end portion of the glass sheet. Thus, not only the end portion of the functional film but also the end portion of the glass sheet can be suitably protected with the fused portion.

In the glass resin laminate having the above-mentioned configuration, it is appropriate that the resin layer comprise a first surface and a second surface, the glass sheet comprise a first glass sheet laminated on the first surface and a second glass sheet laminated on the second surface, the adhesive layer comprise a first adhesive layer configured to bond the first glass sheet to the first surface and a second adhesive layer configured to bond the second glass sheet to the second surface, and the functional film be interposed in at least one of the first adhesive layer or the second adhesive layer.

In the glass resin laminate having the above-mentioned configuration, it is also appropriate that the functional film comprise a first functional film interposed in the first adhesive layer and a second functional film interposed in the second adhesive layer. When the glass resin laminate comprises the plurality of functional films, the laminate has multifunctionality.

Advantageous Effects of Invention

According to the present invention, the functional loss and peeling of the functional film in the glass resin laminate can be prevented.

BRIEF DESCRIPTION OF DRAWINGS

Figure 10:
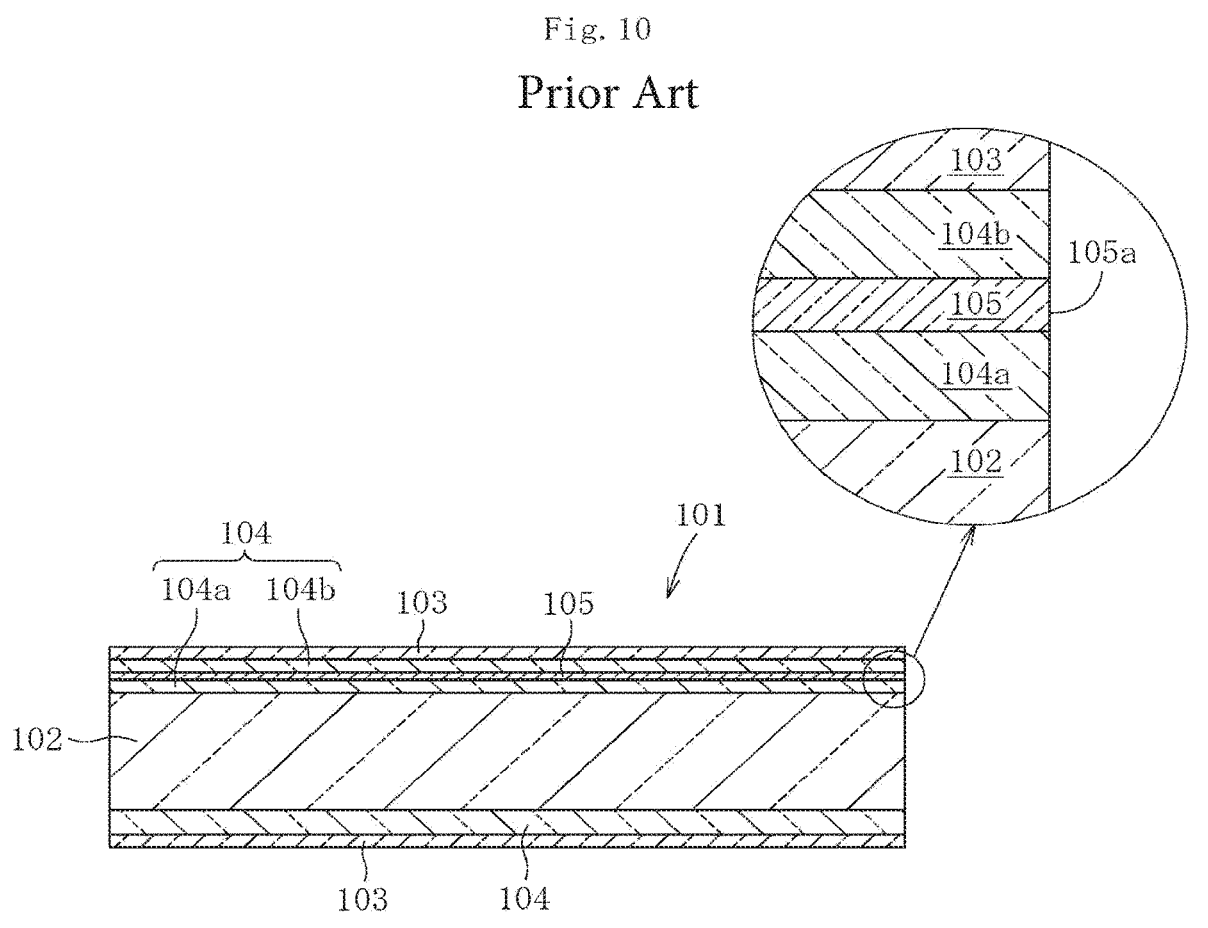

FIG. 10 is a sectional view for illustrating a related-art glass resin laminate.

DESCRIPTION OF EMBODIMENTS

Embodiments of the present invention are described below with reference to the drawings. FIG. 1 to FIG. 6 are illustrations of a glass resin laminate according to a first embodiment of the present invention and a manufacturing method therefor.

Figure 1:
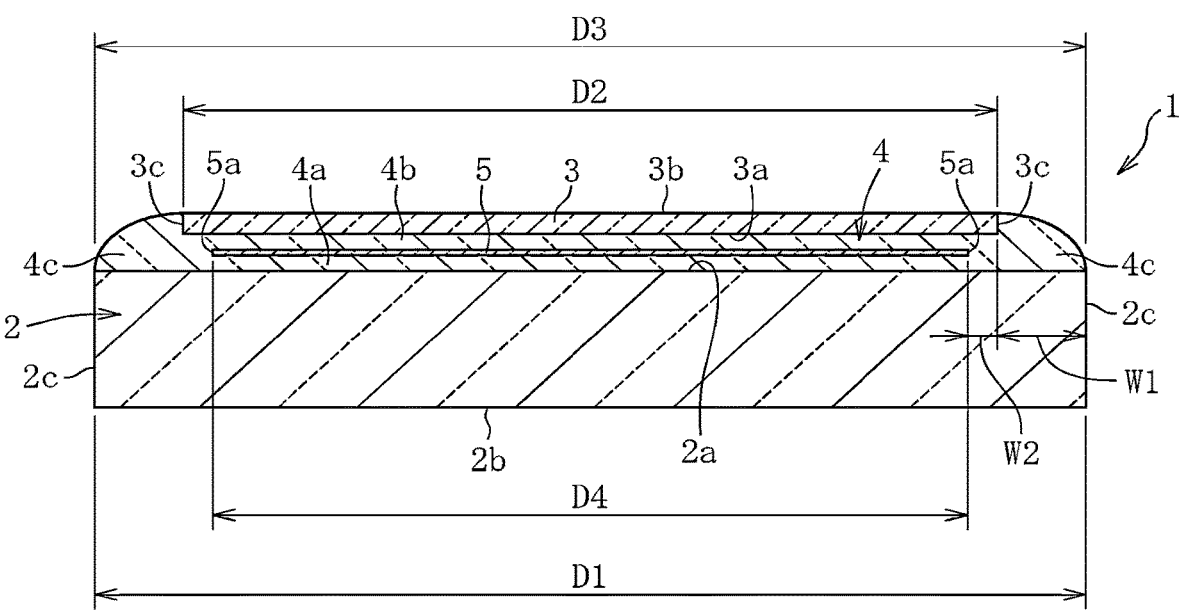
FIG. 1 is a sectional view of a glass resin laminate according to a first embodiment.

As illustrated in FIG. 1, a glass resin laminate 1 comprises: a resin layer 2; a glass sheet 3 laminated on a first surface 2a of the resin layer 2; an adhesive layer 4 configured to bond the glass sheet 3 to the resin layer 2; and a functional film 5 interposed in the adhesive layer 4.

Figure 2:
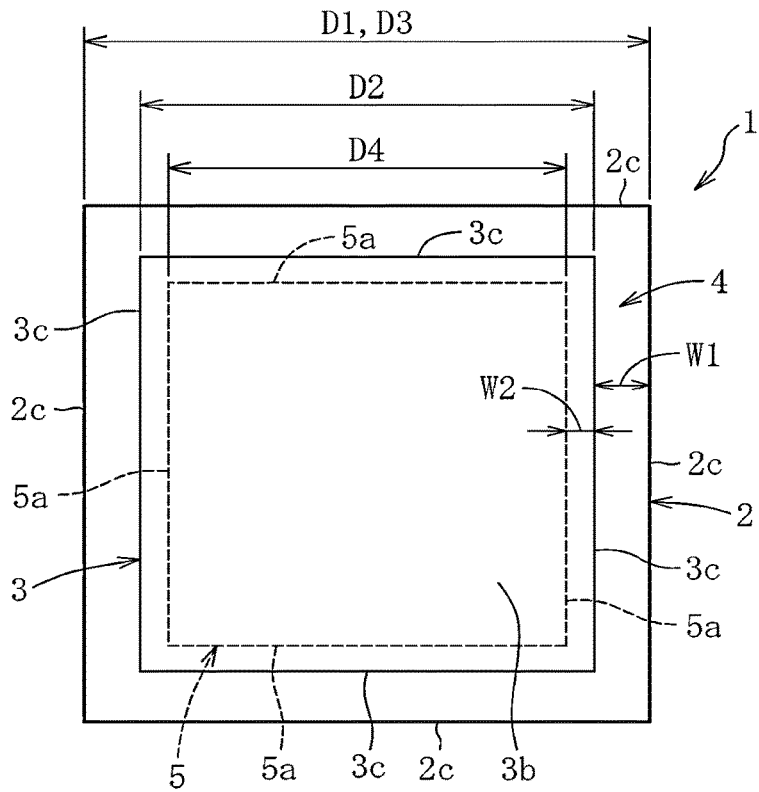
FIG. 2 is a plan view of the glass resin laminate.

As illustrated in FIG. 2, the glass resin laminate 1 is formed in a square shape, but is not limited to this shape. The resin layer 2, the glass sheet 3, the adhesive layer 4, and the functional film 5 are formed in square shapes in correspondence with the shape of the glass resin laminate 1. In the glass resin laminate 1 according to this embodiment, the area of the resin layer 2 is largest, the area of the glass sheet 3 is second largest, and the area of the functional film 5 is smallest. The area of the adhesive layer 4 is set to be comparable to the area of the resin layer 2.

Therefore, as illustrated in FIG. 2, a length dimension D1 of one side of the resin layer 2 is longer than a length dimension D2 of one side of the glass sheet 3. A length dimension D3 of one side of the adhesive layer 4 is substantially equal to the length dimension D1 of one side of the resin layer 2. A length dimension D4 of one side of the functional film 5 is shorter than the length dimension D2 of one side of the glass sheet 3.

A difference (D1–D2) between the length dimension D1 of one side of the resin layer 2 and the length dimension D2 of one side of the glass sheet 3 is preferably set to 4 mm or less. An interval W1 between one side of the resin layer 2 and the corresponding one side of the glass sheet 3 is set to preferably 2 mm or less, more preferably 1 mm or more and 2 mm or less. In addition, a difference (D2–D4) between the length dimension D2 of one side of the glass sheet 3 and the length dimension D4 of one side of the functional film 5 is preferably set to 4 mm or less. An interval W2 between one side of the glass sheet 3 and the corresponding one side of the functional film 5 is set to preferably 2 mm or less, more preferably 1 mm or more and 2 mm or less.

The resin layer 2 has the first surface 2a, a second surface 2b, and an end portion (end surface) 2c between the first surface 2a and the second surface 2b. The resin layer 2 is formed of a plate or film made of a resin in which the first surface 2a and the second surface 2b have substantially the same area. In this embodiment, the glass sheet 3 is laminated on the first surface 2a of the resin layer 2. The thickness of the resin layer 2 is set to preferably 0.01 mm or more and 20 mm or less, more preferably 0.05 mm or more and 15 mm or less, most preferably 0.1 mm or more and 10 mm or less.

As a material for the resin layer 2, polycarbonate and a polymethyl methacrylate resin (PMMA) are preferred. In addition, various resin materials, such as polyethylene terephthalate, polyether ether ketone (PEEK), polyamide, polyvinyl chloride, polyethylene, polypropylene, and polyethylene naphthalate, may be utilized.

The glass sheet 3 has a first surface 3a bonded to the resin layer 2, a second surface 3b positioned opposite to the first surface 3a, and an end portion (end surface) 3c formed between the first surface 3a and the second surface 3b.

The first surface 3a of the glass sheet 3 is bonded to the first surface 2a of the resin layer 2 with the adhesive layer 4. The second surface 3b of the glass sheet 3 forms the outer surface of the glass resin laminate 1. The end portion 3c of the glass sheet 3 is covered with the adhesive layer 4. The glass sheet 3 is positioned in the range of the first surface 2a or second surface 2b of the resin layer 2. Therefore, the end portion 3c of the glass sheet 3 is arranged inside with respect to the end portion 2c of the resin layer 2. Herein, the "inside" of the resin layer 2 refers to the inside of the range partitioned by the peripheral portion of the resin layer 2. In this embodiment, the peripheral portion of the resin layer 2 comprises the four sides of the resin layer 2 formed in a square shape.

It is preferred that the glass sheet 3 be thin as compared to the resin layer 2, and the thickness thereof is set to 1,000 μm or less, preferably 10 μm or more and 700 μm or less, more preferably 50 μm or more and 500 μm or less.

As a material for the glass sheet 3, there may be used silicate glass and silica glass, preferably borosilicate glass, soda lime glass, aluminosilicate glass, and chemical tempered glass, most preferably alkali-free glass. When the alkali-free glass is used as the glass sheet 3, chemically stable glass can be obtained. Herein, the alkali-free glass refers to glass substantially free of an alkali component (alkali metal oxide), specifically glass having a weight ratio of the alkali component of 3,000 ppm or less. In the present invention, the weight ratio of the alkali component is preferably 1,000 ppm or less, more preferably 500 ppm or less, most preferably 300 ppm or less.

It is desired that the Young's modulus of the glass sheet 3 be as high as possible so that the glass sheet 3 has such moderate stiffness that the glass sheet 3 does not bend largely even when its thickness is reduced to 300 μm or less.

From such viewpoint, the Young's modulus of the glass sheet 3 is set to 50 GPa or more, preferably 60 GPa or more, most preferably 70 GPa or more.

A float method, a roll-out method, a slot down-draw method, a redraw method, and the like, which have hitherto been known, may be used for the glass sheet 3, but the glass sheet 3 is preferably formed by an overflow down-draw method. The overflow down-draw method is a method in which a molten glass is poured into an overflow groove provided on an upper portion of a forming body having a substantially wedge cross section, and the molten glasses overflowing from the overflow groove to both sides are caused to flow down along side wall portions of the forming body on both sides to be fused and integrated with each other at the lower end of the forming body, to thereby continuously form a sheet of glass.

A large number of glass sheets 3 having a thickness of 300 μm or less can be produced by the overflow down-draw method at a low cost. For the glass sheet 3 thus produced, it is not necessary to adjust the thickness of the glass sheet 3 by polishing, grinding, chemical etching, or the like. In addition, the overflow down-draw method is a forming method in which both surfaces of the glass sheet 3 are not brought into contact with the forming body during forming. Thus, both the surfaces (translucent surfaces) of the obtained glass sheet 3 serve as fire-polished surfaces, and high surface quality can be achieved without polishing. With this, the adhesive force of the adhesive layer 4 to the glass sheet 3 can be increased, and the glass sheet 3 and the resin layer 2 can be laminated more accurately and precisely.

The thickness of the adhesive layer 4 is set to 1 μm or more and 1,000 μm or less. As a material for the adhesive layer 4, there may be suitably used, for example, an ethylene-vinyl acetate copolymer resin (EVA), a polyvinyl butyral resin (PVB), and a UV-curing resin. In addition, an acrylic pressure-sensitive adhesive, a urethane-based adhesive, a silicone-based pressure-sensitive adhesive, a rubber-based pressure-sensitive adhesive, a UV-curable acrylic adhesive, a UV-curable epoxy-based adhesive, a thermosetting epoxy-based adhesive, a thermosetting melamine-based adhesive, a thermosetting phenol-based adhesive, and the like may be used.

The adhesive layer 4 has a first portion 4a positioned between the resin layer 2 and the functional film 5, and a second portion 4b positioned between the glass sheet 3 and the functional film 5. The functional film 5 is interposed in the adhesive layer 4, that is, between the first portion 4a and the second portion 4b. The end portion of the first portion 4a and the end portion of the second portion 4b are fused to be integrally formed. The portion is hereinafter referred to as "fused portion", and is represented by reference symbol 4c.

The fused portion 4c covers the functional film 5 so that an end portion 5a of the functional film 5 may not be exposed. That is, the functional film 5 is arranged between the first portion 4a and second portion 4b of the adhesive layer 4, and hence its entirety is covered with the adhesive layer 4. In addition, the fused portion 4c is exposed between the end portion 2c of the resin layer 2 and the end portion 3c of the glass sheet 3.

As illustrated in FIG. 1 and FIG. 2, the functional film 5 is positioned in the range of the first surface 3a and second surface 3b of the glass sheet 3. Thus, the end portion 5a of the functional film 5 is arranged inside with respect to the end portion 3c of the glass sheet 3. The "inside" of the glass sheet 3 refers to the inside of the range partitioned by the peripheral portion of the glass sheet 3. In this embodiment, the peripheral portion of the glass sheet 3 comprises the four sides of the glass sheet 3 formed in a square shape.

The thickness of the functional film is preferably 0.012 mm or more and 0.3 mm or less, more preferably 0.038 mm or more and 0.2 mm or less, still more preferably 0.05 mm or more and 0.1 mm or less. The thickness of the functional film is preferably smaller than the thickness of the adhesive layer 4.

The functional film 5 is preferably formed of a resin. A polyester, an olefin, a polycarbonate, an acryl, or the like is used as the resin. When transparency or smoothness is required, a PET is preferably used as the functional film 5, and when heat resistance or a light-shielding property is required, a polypropylene, a polycarbonate, or the like is preferably used as the functional film 5.

The functional film 5 may be paper formed of pulp or the like. Paper has been in widespread use for typing and design printing, and is hence suitable for the purpose of information display or design display. In addition, paper is generally semi-transmissive, and hence can impart a light-adjusting function of adjusting the quantity of transmitted light passing through the glass resin laminate 1. The glass resin laminate 1 using paper as the functional film 5 may be suitably used as a building material, such as a partition, a stair, or a panel for the wall surface of a veranda, through the exploitation of such characteristic.

The functional film 5 may be a composite sheet obtained by compositing a paper raw material with a resin, such as a polyester. When the composite sheet is used, there is an advantage in that the sheet hardly breaks and hardly causes dust generation at the time of the manufacture of the glass resin laminate 1. In addition, there is an advantage in that an adhesive property between the functional film 5 and the adhesive layer 4 is improved.

The functional film 5 may be a product obtained by printing a pattern or the like on a substrate, such as a resin sheet. In this case, paper quality can be reproduced by printing even without the use of paper, or a design property that cannot be represented with paper can be imparted to the film. A nonwoven fabric may be used as the functional film 5.

When a design property is imparted to the functional film 5, a product obtained by printing a woodgrain or metallic pattern on a substrate, such as a resin sheet, may be used. In this case, the film may be suitably used as a building material, furniture, or a covering member for equipment. When the woodgrain or metallic pattern is printed, a non-transmissive sheet, such as a polypropylene, is preferably used as the substrate. When the functional film 5 having printed thereon a metallic pattern is used, metallic gloss can be reproduced by the gloss of the glass sheet 3.

The functional film 5 may have a physical function instead of the design property or in addition to the design property. The functional film 5 may have, for example, an infrared ray-shielding function. In this case, the film may be suitably used as a heat-shielding window or a heat-shielding wall. A method of imparting the infrared ray-shielding function to the functional film 5 is, for example, the formation of a film configured to absorb or reflect an infrared ray on the surface of a resin sheet, such as a PET, serving as a substrate.

The functional film 5 may have an electromagnetic wave-shielding function. In this case, the film may be suitably used as a window or wall configured to shield an electromagnetic wave harmful to a human body or an electromagnetic wave that is not required for the environment. Specifically, the film is considered to find use in medical facilities. A method of imparting the electromagnetic wave-shielding function to the functional film 5 is, for example, the formation of a transparent conductive film, such as an ITO film or a copper film, on the surface of a resin sheet, such as a PET, serving as a substrate.

The functional film 5 may have semi-transmissivity to visible rays. In this case, the film may be suitably used as a covering member for various kinds of equipment or a partition. A method of imparting the semi-transmissivity to the functional film 5 is, for example, the roughening of the surface of a resin sheet, such as a PET, by sandblasting treatment, chemical treatment, or the like in addition to the use of paper or a product similar to paper as the functional film 5 as described above. When such treatment is performed, the transmissivity of light may be adjusted by changing the roughness of the surface of the sheet or by subjecting one surface, or both surfaces, thereof to the surface roughening treatment.

The functional film 5 may have a function of reflecting visible rays. In this case, the film may be used as a safe and lightweight mirror. A method of imparting the reflecting function to the film is, for example, the formation of a reflective film on the surface of a substrate, such as a resin sheet. The formation range of the reflective film may be the entirety of the surface, or may be part of the surface. In addition, a half mirror may be provided by imparting semi-transmissivity to the reflective film.

The functional film 5 may have a sensor pattern concerning a touch sensor, a pressure sensor, an optical sensor, or the like. The sensor pattern is formed on the surface of the functional film 5 by deposition, sputtering, or any other film formation method.

Figure 3:
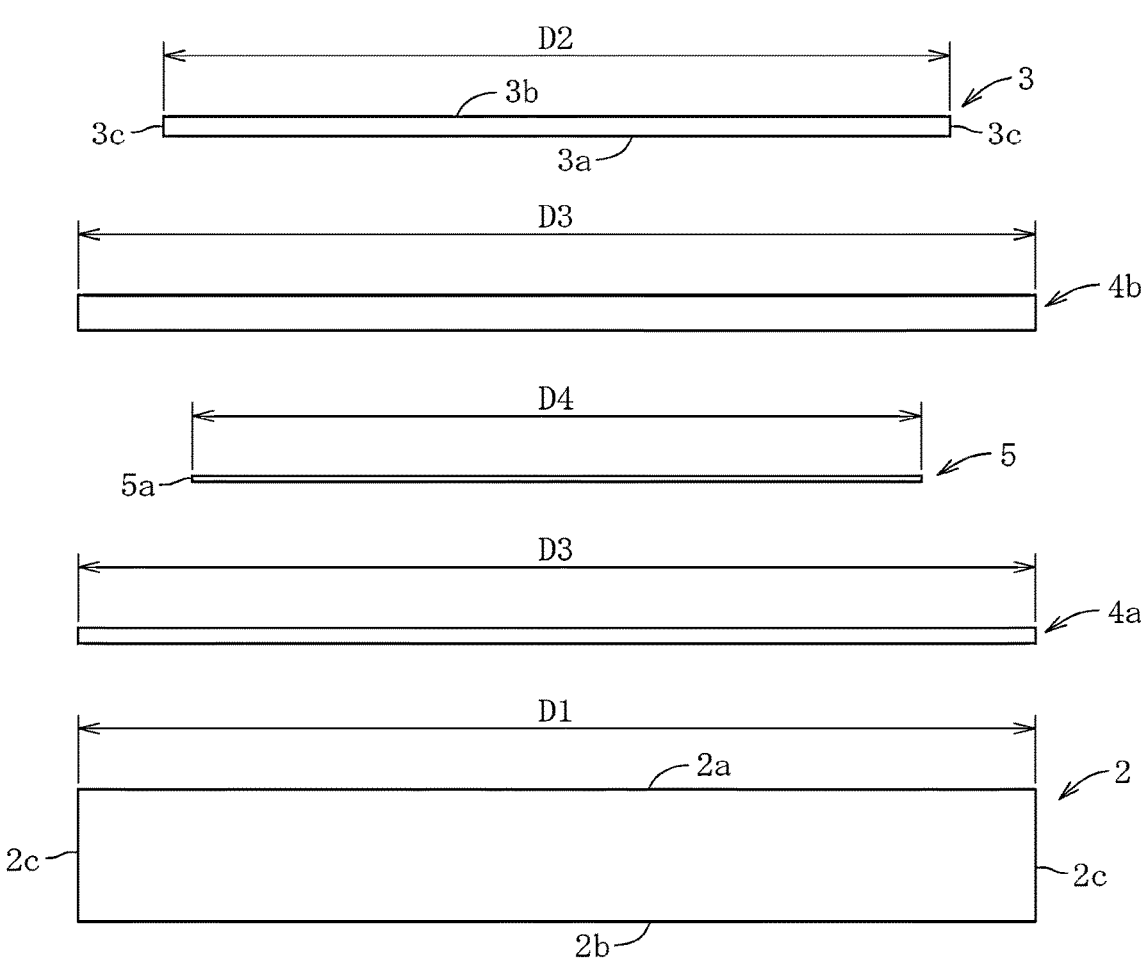
FIG. 3 is a side view for illustrating one step of a method of manufacturing the glass resin laminate.

The method of manufacturing the glass resin laminate 1 having the above-mentioned configuration is described below with reference to FIG. 3 to FIG. 6. As illustrated in FIG. 3, the respective components forming the glass resin laminate 1, that is, the resin layer 2 (resin plate), the glass sheet 3, the adhesive layer 4 (adhesive sheets), and the functional film 5 are prepared (preparing step). In this case, the adhesive layer 4 comprises an adhesive sheet corresponding to the first portion 4a and an adhesive sheet corresponding to the second portion 4b. The thickness of the adhesive sheet corresponding to the first portion 4a is set to be larger than the thickness of the adhesive sheet corresponding to the second portion 4b, but is not limited thereto.

Figure 4:
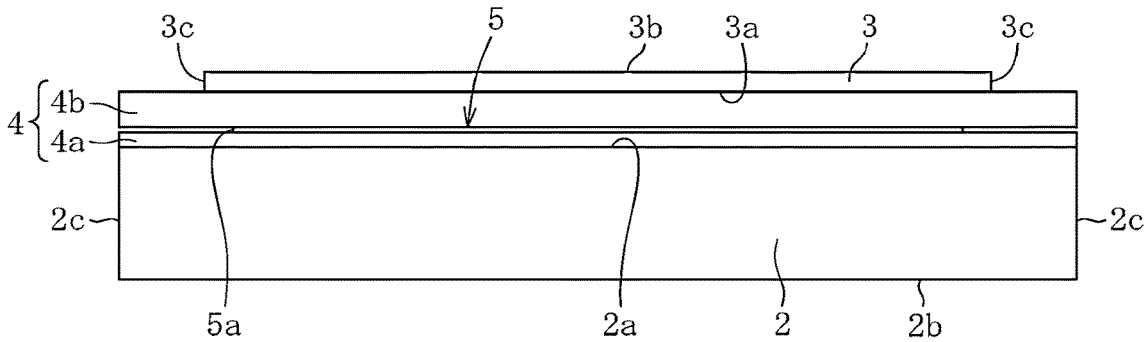
FIG. 4 is a side view for illustrating one step of the method of manufacturing the glass resin laminate.

Next, as illustrated in FIG. 4, the respective components 2 to 5 are superimposed. At this time, the functional film 5 is brought into a state of being sandwiched between the adhesive sheet corresponding to the first portion 4a and the adhesive sheet corresponding to the second portion 4b in the adhesive layer 4. After that, under a state in which the respective components 2 to 5 are superimposed, the components are subjected to thermal pressure bonding with an autoclave apparatus to be bonded to one another. The adhesive layer 4 (the first portion 4a and the second portion 4b) is softened by the heating, and hence its end portions are fused (see FIG. 5). Thus, the fused portion 4c is formed in the adhesive layer 4. The fused portion 4c covers the end portion 5a of the functional film 5, and is brought into a state of being exposed between the end portion 2c of the resin layer 2 and the end portion 3c of the glass sheet 3.

Figure 5:
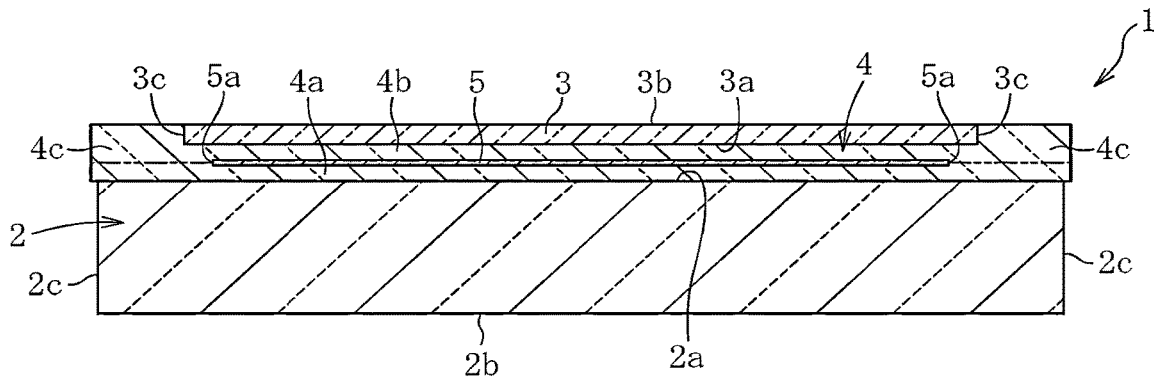
FIG. 5 is a sectional view for illustrating one step of the method of manufacturing the glass resin laminate.

In addition, under a state in which the adhesive layer 4 is softened by the heating, the glass sheet 3 is pressed to be embedded in one surface of the first portion 4a of the adhesive layer 4 (see FIG. 5). Thus, the end portion 3c of the glass sheet 3 is covered with the fused portion 4c of the adhesive layer 4.

Figure 6:
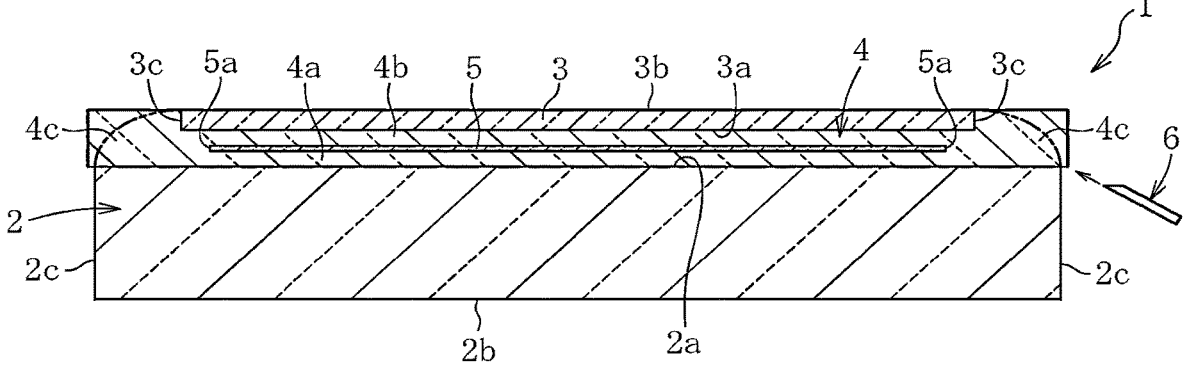
FIG. 6 is a sectional view for illustrating one step of the method of manufacturing the glass resin laminate.

After that, as illustrated in FIG. 6, part of the fused portion 4c is cut off with a cutter 6. The cutter 6 is heated in advance so that its temperature may be equal to or more than the temperature of the fused portion 4c that has been softened. Part of the fused portion 4c is cut off with the cutter 6 so that the fused portion 4c may be a convex curved surface (see a two-dot chain line in FIG. 6). The glass resin laminate 1 illustrated in FIG. 1 is completed by the curing of the adhesive layer 4.

When the glass resin laminate 1 is manufactured by using a UV-curable adhesive (UV-curing resin), the adhesive applied so as to comprise the functional film 5 in an inside thereof is irradiated with UV light without the use of any autoclave apparatus.

According to the glass resin laminate 1 according to this embodiment described above, the end portion 5a of the functional film 5 arranged between the resin layer 2 and the glass sheet 3 is covered with the fused portion 4c of the adhesive layer 4, and hence the end portion 5a can be protected without being exposed. Thus, the functional loss and peeling of the functional film 5 in the glass resin laminate 1 can be reliably prevented. In addition, the end portion 5a of the functional film 5 is arranged inside with respect to the end portion 3c of the glass sheet 3, and hence the functional film 5 can be entirely covered and protected with the glass sheet 3.

Figure 7:
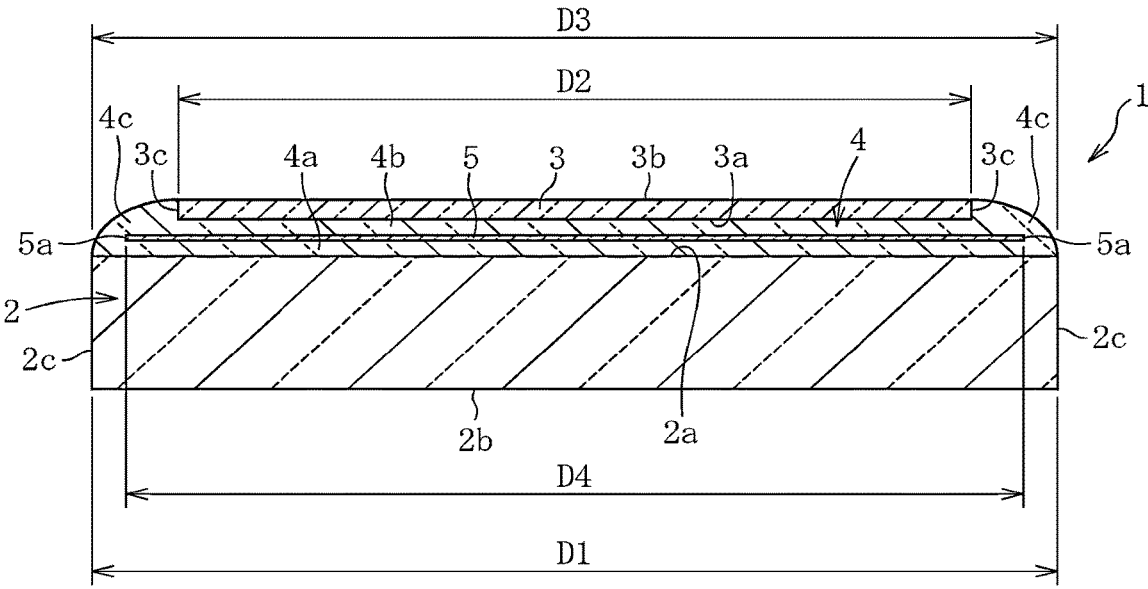
FIG. 7 is a sectional view of a glass resin laminate according to a second embodiment.

FIG. 7 is an illustration of a glass resin laminate according to a second embodiment. In the first embodiment described above, the length dimension D4 of one side of the functional film 5 is set to be smaller than the length dimension D2 of one side of the glass sheet 3. In this embodiment, however, the length dimension D4 is set to be larger than the length dimension D2. In addition, as in the first embodiment, the length dimension D4 of one side of the functional film 5 is set to be smaller than the length dimension D1 of one side of the resin layer 2. As in the first embodiment, the end portion 5a of the functional film 5 is covered with the fused portion 4c of the adhesive layer 4 exposed between the end portion 2c of the resin layer 2 and the end portion 3c of the glass sheet 3.

Figure 8:
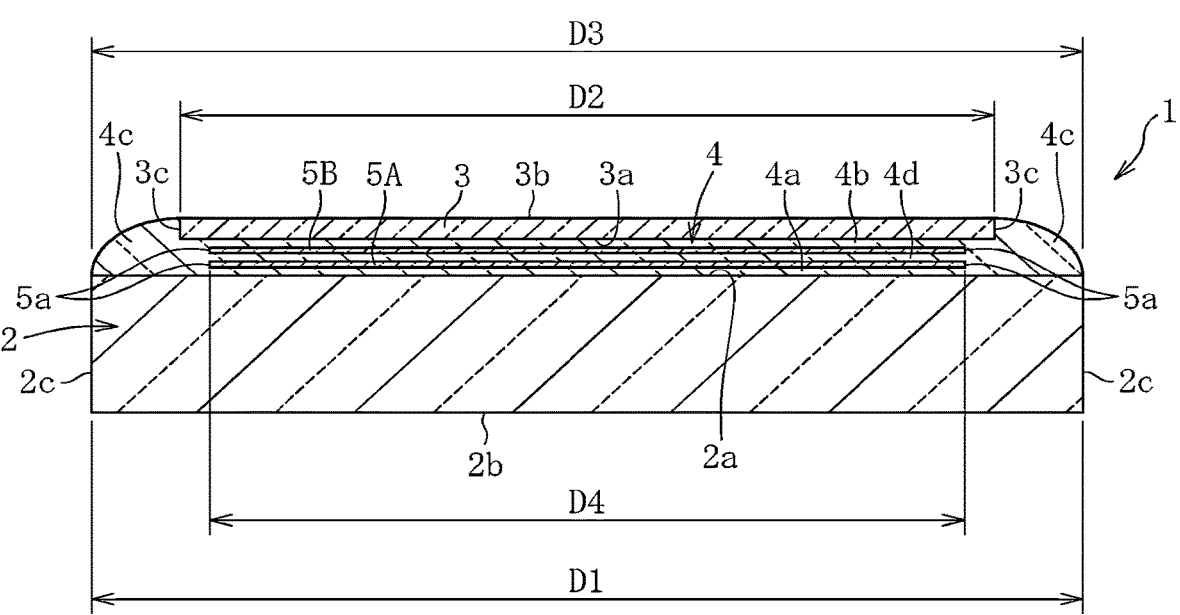
FIG. 8 is a sectional view of a glass resin laminate according to a third embodiment.

FIG. 8 is an illustration of a glass resin laminate according to a third embodiment. In the first embodiment described above, the one functional film 5 is interposed in the adhesive layer 4. In this embodiment, however, two functional films 5A and 5B are interposed in the adhesive layer 4. The functional films 5A and 5B comprise the first functional film 5A positioned on the resin layer 2 side and the second functional film 5B positioned on the glass sheet 3 side. The first functional film 5A and the second functional film 5B are of the same shape herein, but may have different dimensions. The first functional film 5A and the second functional film 5B have functions different from each other.

The adhesive layer 4 comprises: the first portion 4a configured to bond the resin layer 2 and the first functional film 5A; the second portion 4b configured to bond the glass sheet 3 and the second functional film 5B; and a third portion 4d configured to bond the first functional film 5A and the second functional film 5B. The adhesive layer 4 has the fused portion 4c obtained by fusing the end portion of the first portion 4a, the end portion of the second portion 4b, and the end portion of the third portion 4d. The end portion 5a of the first functional film 5A and the end portion 5a of the second functional film 5B are covered with the fused portion 4c.

Figure 9:
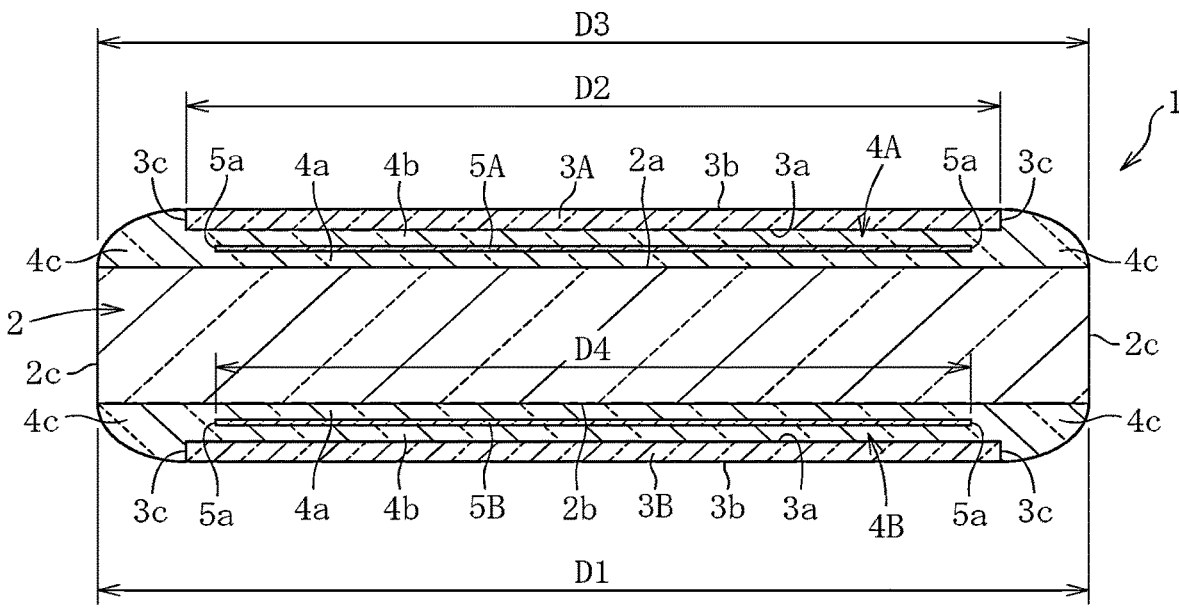
FIG. 9 is a sectional view of a glass resin laminate according to a fourth embodiment.

FIG. 9 is an illustration of a glass resin laminate according to a fourth embodiment. In the first embodiment described above, the one glass sheet 3 is laminated on the first surface 2*a* of the resin layer 2. However, the glass resin laminate 1 according to this embodiment is obtained by laminating two glass sheets 3A and 3B on both the first surface 2*a* and second surface 2*b* of the resin layer 2. That is, the glass sheets 3A and 3B comprise the first glass sheet 3A laminated on the first surface 2*a* of the resin layer 2 and the second glass sheet 3B laminated on the second surface 2*b* thereof. Materials of the same kind may be used in the first glass sheet 3A and the second glass sheet 3B, or materials of different kinds may be used therein. The first glass sheet 3A and the second glass sheet 3B may have different thicknesses in accordance with their applications.

Adhesive layers 4A and 4B comprise: the first adhesive layer 4A configured to bond the first glass sheet 3A to the first surface 2*a* of the resin layer 2; and the second adhesive layer 4B configured to bond the second glass sheet 3B to the second surface 2*b* thereof. As in the first embodiment, each of the adhesive layers 4A and 4B has the first portion 4*a*, the second portion 4*b*, and the fused portion 4*c*.

The functional films 5A and 5B comprise the first functional film 5A interposed in the first adhesive layer 4A and the second functional film 5B interposed in the second adhesive layer 4B. The end portions 5*a* of the respective functional films 5A and 5B are covered with the fused portions 4*c* of the corresponding respective adhesive layers 4A and 4B.

The present invention is not limited to the configurations of the above-mentioned embodiments. In addition, the action and effect of the present invention are not limited to those described above. The present invention may be modified in various forms within the range not departing from the spirit of the present invention.

In each of the above-mentioned embodiments, the glass resin laminate 1 of a square shape is given as an example. However, its shape is not limited thereto. The glass resin laminate 1 may be formed in various shapes, such as a circular shape, a rectangle, a polygon, and a deformed shape, in accordance with its applications.

REFERENCE SIGNS LIST

1 glass resin laminate
2 resin layer
2*a* first surface
2*b* second surface
2*c* end portion of resin layer
3 glass sheet
3A first glass sheet
3B second glass sheet
3*c* end portion of glass sheet
4 adhesive layer
4A first adhesive layer
4B second adhesive layer
4*a* first portion
4*b* second portion
4*c* fused portion
5 functional film
5A first functional film
5B second functional film
5*a* end portion of functional film

The invention claimed is:

1. A method for manufacturing a glass resin laminate, the glass resin laminate comprising:
a resin layer;
a glass sheet;
an adhesive layer configured to bond the glass sheet and the resin layer; and a functional film interposed in the adhesive layer, the method comprising:
a laminating step for superimposing the resin layer, the glass sheet, an adhesive sheet for forming the adhesive layer, and the functional film; and
a heating step for heating the adhesive sheet,
wherein the adhesive sheet comprises a first adhesive sheet positioned between the resin layer and the functional film, and a second adhesive sheet positioned between the glass sheet and the functional film,
wherein an area of the first adhesive sheet and an area of the second adhesive sheet are set to be larger than an area of the glass sheet,
wherein an area of the functional film is set to be larger than the area of the glass sheet,
wherein, in the laminating step, an end portion of the first adhesive sheet and an end portion of the second adhesive sheet are arranged at an outer side with respect to an end portion of the glass sheet,
wherein, in the laminating step, an end portion of the functional film is arranged at an outer side with respect to the end portion of the glass sheet, and
wherein, in the heating step, a fused portion where the end portion of the first adhesive sheet and the end portion of the second adhesive sheet are fused together is formed.

2. The method of manufacturing a glass resin laminate according to claim 1,
wherein, in the heating step, the glass sheet is embedded in the second adhesive sheet that has been softened by the heating to cover the end portion of the glass sheet by the fused portion.

3. The method of manufacturing a glass resin laminate according to claim 1,
wherein the area of the glass sheet is set to be smaller than an area of the resin layer, and
wherein, in the laminating step, the end portion of the glass sheet is arranged inside with respect to an end portion of the resin layer.

4. The method of manufacturing a glass resin laminate according to claim 3,
wherein the fused portion is exposed between the end portion of the resin layer and the end portion of the glass sheet.

5. The method of manufacturing a glass resin laminate according to claim 1,
wherein the resin layer comprises a first surface and a second surface,
wherein the glass sheet comprises a first glass sheet laminated on the first surface of the resin layer and a second glass sheet laminated on the second surface of the resin layer,
wherein the adhesive layer comprises a first adhesive layer configured to bond the first glass sheet to the first surface of the resin layer and a second adhesive layer configured to bond the second glass sheet to the second surface of the resin layer, and
wherein the functional film is interposed in at least one of the first adhesive layer or the second adhesive layer.

6. The method of manufacturing a glass resin laminate according to claim 5,
wherein the functional film comprises a first functional film interposed in the first adhesive layer and a second functional film interposed in the second adhesive layer.

* * * * *